United States Patent
Müeller-Hipper et al.

(10) Patent No.: US 9,202,161 B2
(45) Date of Patent: Dec. 1, 2015

(54) TRANSPONDER INLAY FOR A DOCUMENT FOR PERSONAL IDENTIFICATION AND A METHOD FOR PRODUCING A TRANSPONDER INLAY

(75) Inventors: Andreas Müeller-Hipper, Regensburg (DE); Frank Püeschner, Kelheim (DE)

(73) Assignee: Infineon Technologies AG, Neubiberg (DE)

( * ) Notice: Subject to any disclaimer, the term of this patent is extended or adjusted under 35 U.S.C. 154(b) by 910 days.

(21) Appl. No.: 12/541,326

(22) Filed: Aug. 14, 2009

(65) Prior Publication Data
US 2010/0038432 A1    Feb. 18, 2010

(30) Foreign Application Priority Data
Aug. 14, 2008 (DE) .................. 10 2008 037 817

(51) Int. Cl.
G06K 19/06 (2006.01)
G06Q 40/00 (2012.01)
G06K 19/077 (2006.01)
G06K 19/02 (2006.01)
B42D 25/00 (2014.01)
B42D 25/45 (2014.01)

(52) U.S. Cl.
CPC .......... *G06K 19/07749* (2013.01); *B42D 25/00* (2014.10); *G06K 19/025* (2013.01); *B42D 25/45* (2014.10); *B42D 2033/46* (2013.01); *Y10T 29/49018* (2015.01)

(58) Field of Classification Search
USPC .......................................................... 235/379
See application file for complete search history.

(56) References Cited

U.S. PATENT DOCUMENTS

| 5,852,289 | A  | * | 12/1998 | Masahiko ...................... 235/492 |
| 6,353,420 | B1 | * | 3/2002  | Chung ........................... 343/895 |
| 6,421,013 | B1 | * | 7/2002  | Chung ...................... 343/700 MS |
| 6,736,918 | B1 | * | 5/2004  | Ichikawa et al. ............... 156/182 |
| 2005/0116324 | A1 | * | 6/2005 | Yamaguchi .................... 257/678 |
| 2005/0275071 | A1 | * | 12/2005 | Masuda et al. ................. 257/672 |
| 2006/0080819 | A1 | * | 4/2006 | McAllister .................... 29/403.3 |
| 2007/0114889 | A1 | * | 5/2007 | Cobianu et al. ................ 310/338 |
| 2007/0182154 | A1 | * | 8/2007 | Hoeppner et al. .............. 283/72 |
| 2008/0155822 | A1 | * | 7/2008 | Finn ................................ 29/832 |

FOREIGN PATENT DOCUMENTS

| DE | 10338444 A1    | 6/2005 |
| DE | 102004055495 A1 | 5/2006 |
| EP | 1662426 A1      | 5/2006 |

* cited by examiner

*Primary Examiner* — Michael G Lee
*Assistant Examiner* — David Tardif
(74) *Attorney, Agent, or Firm* — Murphy, Bilak & Homiller, PLLC

(57) ABSTRACT

A transponder inlay for a document for personal identification having a transponder substrate, for arrangement of a transponder unit comprising a chip and an antenna, a covering layer, an adhesive layer, wherein the adhesive layer is arranged between the transponder substrate and the covering layer, wherein the transponder substrate has a cutout and the adhesive layer extends at least partly into the cutout.

18 Claims, 4 Drawing Sheets

TRANSPONDER INLAY FOR A DOCUMENT FOR PERSONAL IDENTIFICATION AND A METHOD FOR PRODUCING A TRANSPONDER INLAY

PRIORITY CLAIM

The present application claims the benefit of German Patent Application No. 102008037817.8, filed Aug. 14, 2008, which is incorporated by reference herein in its entirety.

BACKGROUND

The present invention relates to a transponder inlay for a document for personal identification, to a document for personal identification, and to a method for producing a transponder inlay.

On account of constantly rising security requirements, diverse endeavors are being made to improve existing systems for personal identification or to create new identification possibilities which enable simplified and faster detection of person-specific data for personal identification. Since, particularly in the field of personal documents to be carried by persons, there are very different standards concerning the data detection, it has proved to be necessary not to eliminate conventional personal identification documents, such as the so-called personal identity card, for example, without replacement but rather to modify the existing system in such a way that advanced systems such as, for example, the recognition of persons by means of transponders, can also be employed in a supplementary manner.

One possibility for realizing such dual identification systems consists in providing a conventional personal identity card with a transponder on which, in accordance with the personal data established in the security print of the identity paper, the data are stored in the chip module of the transponder and can be retrieved contactlessly by means of a suitable reader. Security aspects have to be taken into account to an increased extent in this case. It is necessary to implement measures which prevent exchange, removal or manipulation of the personal identification transponder.

German Patent No. 10338444A1, issued Jun. 9, 2005, discloses a transponder inlay for a document for personal identification having an identity page. The transponder inlay has a multilayered construction. A transponder unit, comprising a chip and an antenna, is arranged on a transponder substrate. Two inlay covering layers accommodate the transponder substrate with the transponder unit between themselves.

SUMMARY

The present invention is based on the object of providing a transponder inlay which can be produced cost-effectively.

This object is achieved by means of a transponder inlay comprising the features of claim 1 and by means of a method for producing a transponder inlay comprising the features of claim 17.

The transponder inlay according to the invention for a document for personal identification comprises a transponder substrate having one or more cutouts and an adhesive layer, wherein the adhesive of the adhesive layer extends at least partly into the cutout. A chip and an antenna, which together form a transponder unit, are arranged on the transponder substrate. Furthermore, the transponder inlay has a covering layer. The covering layer is connected to the transponder substrate by means of the adhesive layer. The transponder inlay according to the invention requires only one covering layer and enables designs having a small thickness in comparison with known transponder inlays having two covering layers and thus a multilayered construction.

In the method according to the invention for producing a transponder inlay for a document for personal identification, a transponder substrate is provided. The transponder substrate has at least one cutout. A transponder unit, comprising a chip and an antenna, is arranged on the transponder substrate. The transponder substrate is connected to a covering layer by means of an adhesive layer, wherein the adhesive layer at least partly fills the cutout in the transponder substrate.

By virtue of the simple construction, the transponder inlay according to the invention is less complicated to produce than known transponder inlays having a multilayered construction. Precisely in high-volume manufacturing, as is the case for identification transponders, simply constructed components which are simple to manufacture guarantee a cost and hence competitive advantage. In addition, thin transponder inlays are particularly well suited to integration in personal identification documents.

In a further advantageous exemplary embodiment, the cutout of the transponder substrate can also be filled with the adhesive of the adhesive layer.

A particularly good connection between the transponder substrate and the covering layer is obtained if the adhesive layer extends not only into the cutout of the transponder substrate but also over the side of the transponder substrate lying opposite the covering layer. Not only the adhesive connection but also a positively locking connection arises in this case. The transponder substrate can advantageously be embedded into the adhesive of the adhesive layer in this case. This embedding of the transponder substrate into the adhesive layer additionally provides for a mechanical protection of the transponder substrate and of the transponder unit, comprising the chip and the antenna, arranged on said substrate.

Inter alia, epoxy resin, cyanoacrylate, silicones, pressure-sensitive adhesives, polyurethane adhesives and radiation-curing adhesives can be employed as adhesive for the adhesive layer.

The transponder unit can also comprise a leadframe alongside the chip and the antenna. By way of example, a potted chip is situated on the leadframe. Such an arrangement of potted chip and leadframe is also referred to as a chip module. In this case, chip and leadframe are electrically connected to one another by means of bonding wires. However, the chip can also be connected directly to the transponder substrate or to the leadframe by means of flip-chip technology.

In a further exemplary embodiment, the transponder substrate can have a window opening for receiving the chip. Furthermore, the covering layer, which can also be formed in multilayer fashion, can also have a window opening for at least partly receiving the chip, such that a transponder inlay having a small structural height can be produced.

In one advantageous embodiment, the top side of the covering layer terminates in a manner aerially flush with the top side of the chip. This results in an embodiment which is plane-parallel, overall with respect to the surfaces of the transponder inlay, and which enables the application of, for example, an extremely thin binding covering layer without there being the risk of the chip standing out in the surface.

The antenna can be formed as a coil having at least one turn. The antenna can be a wire antenna. Other types of antennas, for example produced by printing or etching technology, are also possible. The cutout in the transponder substrate can be arranged in the region of the innermost coil turn. One or a plurality of cutouts can be provided. In one exemplary embodiment, in which the antenna likewise comprises a coil having at least one turn, the cutout in the transponder substrate can be situated outside the region of the outermost coil turn. In this exemplary embodiment, too, one or a plurality of cutouts can be provided. A cutout can also be provided in the edge region of the transponder substrate. If there are a plurality of cutouts, they can be arranged in the form of a pattern or tiling. The cutouts can be situated within and outside the antenna coil. The number, size, shape and position of the cutout can vary depending on the exemplary embodiment.

It is advantageous if the covering layer is formed from a foamed plastic and the transponder substrate is formed from a thermoplastic. A particularly good connection to the adhesive of the adhesive layer occurs through the pores of the foamed plastic of the covering layer.

The transponder inlay can be connected to a document for personal identification by means of the adhesive layer. However, it is also possible to realize other connecting techniques for introducing the transponder inlay into the document for personal identification, such as sewing, laminating, adhesive bonding using additional adhesive. The transponder inlay according to the invention thus makes it possible to produce a personal identification document, such as, for example, a personal identity card or a passport, with a supplemented transponder function. The transponder inlay is arranged in the document in such a way that it cannot be removed or exchanged without the document being destroyed. Furthermore, the construction of the transponder inlay according to the invention enables method sequences during the production of a corresponding document which are comparable to those in the production of a conventional personal identification document.

It proves to be advantageous if the transponder inlay forms an identity page or is formed in an identity page. For this purpose, the transponder inlay can also be provided directly with a security print. The transponder inlay according to the invention can be introduced into a document for personal identification, for example a passport, by means of the adhesive layer for example. The binding of such a document for personal identification often comprises a layer of paperboard or cloth and is referred to as a cover or book cover binding. The transponder inlay according to the invention can be connected to the cover or an identity page of the document for personal identification, advantageously by means of the adhesive layer.

The document according to the invention for personal identification comprising a plurality of identity pages arranged in a book cover binding can have a book cover binding formed in multilayer fashion with a transponder inlay of the above-mentioned type arranged therein.

In another exemplary embodiment of the method according to the invention, the cutout in the transponder substrate is filled with adhesive of the adhesive layer.

A particularly advantageous connection between the transponder substrate and the covering layer is obtained if the transponder substrate is embedded into the adhesive layer.

BRIEF DESCRIPTION OF THE DRAWINGS

Preferred exemplary embodiments of the transponder inlay for a document for personal identification are explained in greater detail below with reference to the figures, in which.

DETAILED DESCRIPTION

Figure 1:
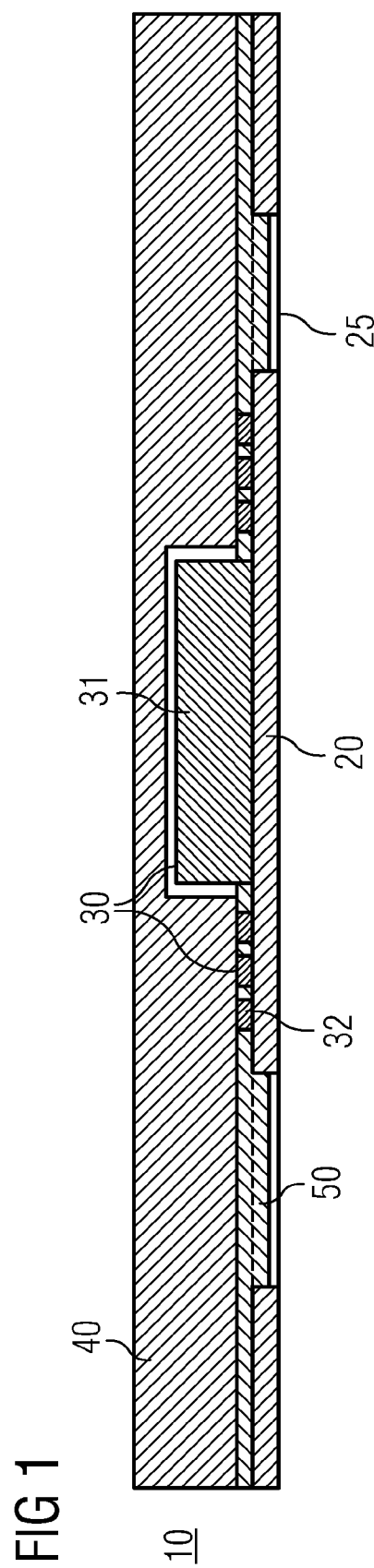
FIG. 1 shows a first exemplary embodiment of a transponder inlay in a sectional side view.

FIG. 1 shows a course of a section through a first exemplary embodiment of the transponder inlay 10 according to the invention. The transponder inlay 10 is suitable for application in a document for personal identification. A transponder unit 30, comprising a chip 31 and an antenna 32, is arranged on the transponder substrate 20. In the exemplary embodiment shown in FIG. 1, a covering layer 40 completely covers the chip 31. The chip 31 is fixed on the transponder substrate 20 for example by means of flip-chip technology. The antenna 32 is likewise situated on the transponder substrate 20. An adhesive layer 50 connects the transponder substrate 20 to the covering layer 40. Cutouts 25 in the transponder substrate 20 are at least partly filled with the adhesive of the adhesive layer 50.

Figure 2:
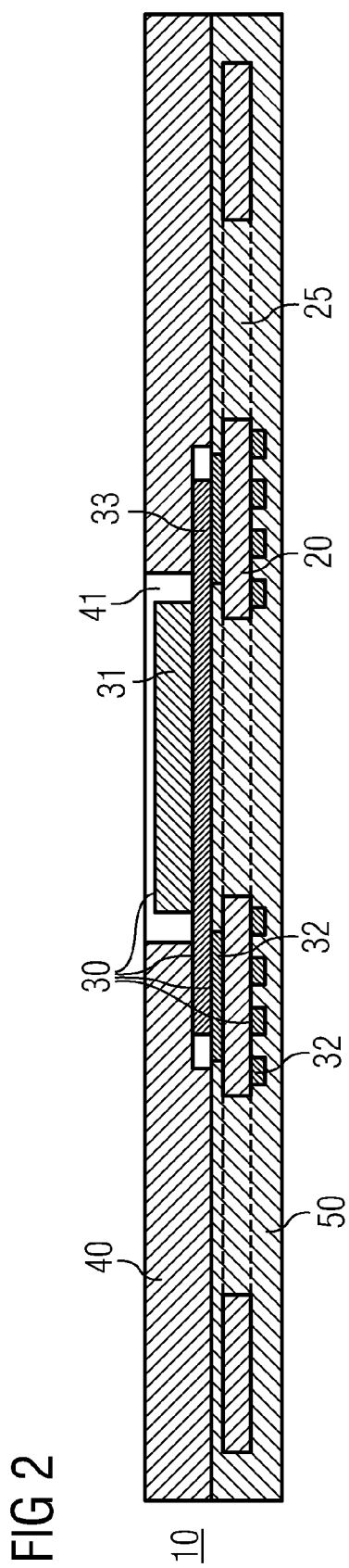
FIG. 2 shows a second exemplary embodiment of a transponder inlay in a sectional side view.

FIG. 2 shows a course of a section through a second exemplary embodiment of the transponder inlay 10. In this exemplary embodiment, the transponder substrate 20 is embedded, preferably completely, into the adhesive layer 50. In this exemplary embodiment, the covering layer 40 is not closed, but rather has a window opening 41 in the region of the chip 31. Furthermore, in this exemplary embodiment, the chip 31 is situated on a leadframe 33. The antenna 32 is a flat antenna in the exemplary embodiment shown in FIG. 2. Said flat antenna can be formed using printing or etching technology, for example. However, the use of a wire antenna is also possible. In this exemplary embodiment, the coils of the antenna 32 are situated on the underside of the transponder substrate 20. An electrically conductive connection to the leadframe is produced by means of a through contact. In this exemplary embodiment, the transponder unit 30 illustrated comprises a chip 31, a leadframe 33 and an antenna 32. In this exemplary embodiment, the transponder substrate 20 is embedded into the adhesive layer 50. The cutouts 25 are completely filled with adhesive of the adhesive layer 50. Since the adhesive layer 50 also embeds the antenna 32, the antenna 32 is well protected against mechanical loads.

Figure 3:
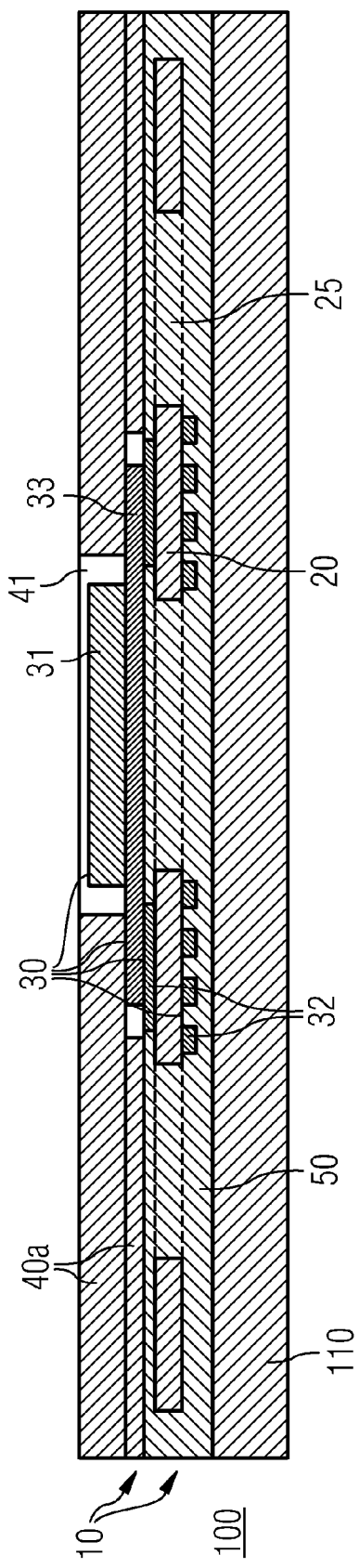
FIG. 3 shows a document for personal identification having a third exemplary embodiment of a transponder inlay, which is connected to a cover, in a sectional side view.

FIG. 3 shows a document for personal identification 100 having a third exemplary embodiment of a transponder inlay 10, which is connected to a cover 110, in a sectional side view. In this exemplary embodiment, the transponder inlay 10 according to the invention is connected to the cover 110 of a document for personal identification, for example a passport, by means of an adhesive layer 50. However, the transponder inlay 10 according to the invention can also be connected to any arbitrary identity page of a document for personal identification, by means of the adhesive layer 50. In a further exemplary embodiment, after a print has been applied, for example, the transponder inlay 10 alone can form the document for personal identification. In the exemplary embodiment shown in FIG. 3, the covering layer 40a comprises a plurality of layers. The use of a plurality of layers for the covering layer 40a can simplify production. As in the exemplary embodiment in FIG. 2, the exemplary embodiment in FIG. 3 has a window opening 41 in the covering layer 40a. The chip 31 is arranged on a leadframe 33. The chip 31 together with the leadframe 33 and the antenna 32 forms the transponder unit 30. In this exemplary embodiment, the substrate 20 is likewise embedded into the adhesive layer 50. In this case, the cutouts 25 are completely filled with adhesive. By virtue of the transponder substrate 20 being wetted on both sides with adhesive of the adhesive layer 50, a particularly good connection results between the covering layer 40a, the transponder substrate 20 and the cover 110.

Figure 4:
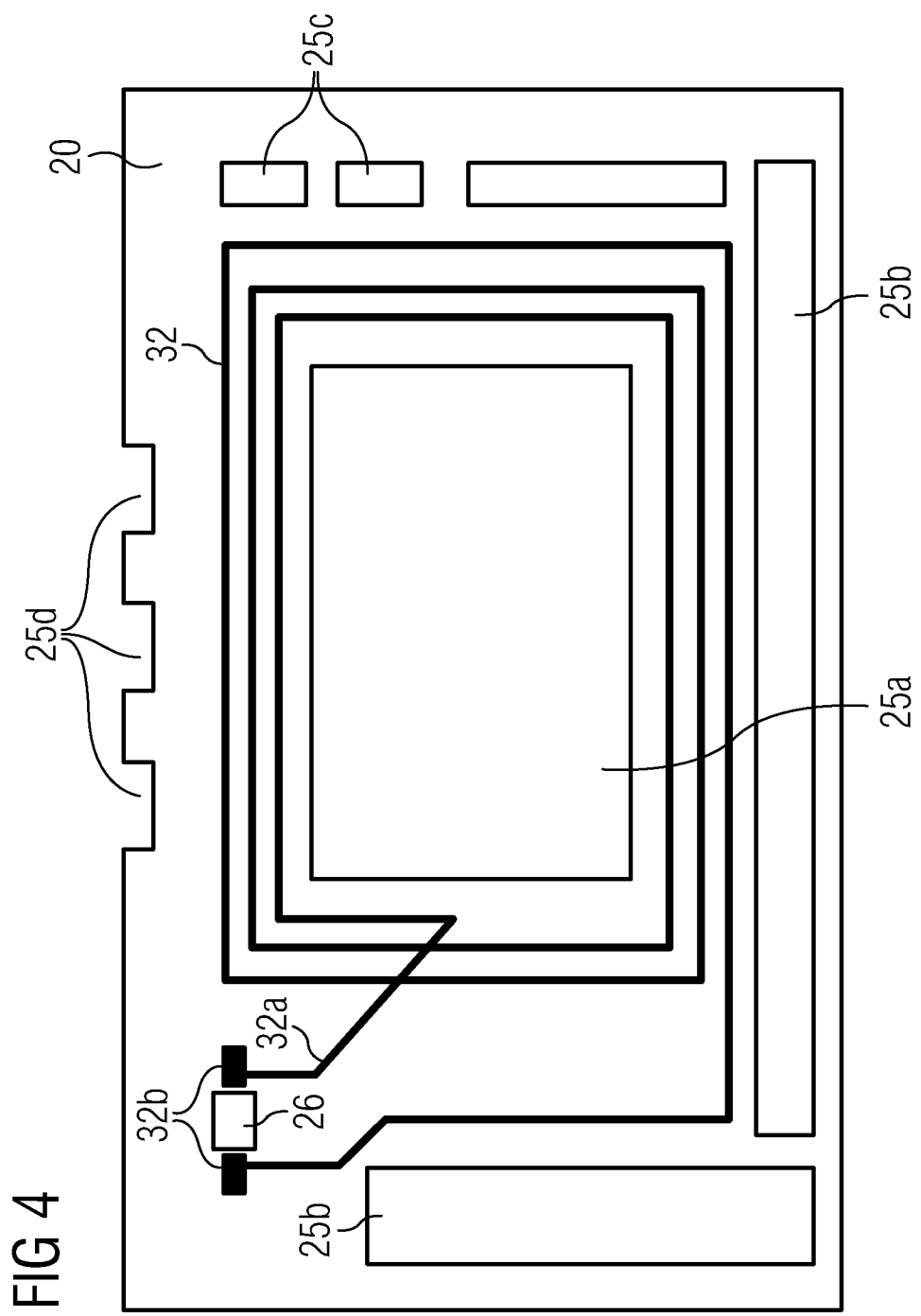
FIG. 4 shows a plan view of a transponder substrate of a further exemplary embodiment of the transponder inlay according to the invention, wherein the antenna is arranged in the form of a coil on the transponder substrate.

FIG. 4 shows a plan view of a transponder substrate 20 for use in the transponder inlay 10 according to the invention. A plurality of cutouts 25a, 25b, 25c and 25d are shown by way of example in the plan view of the transponder substrate 20. Said cutouts can be introduced either alone or in combination into the transponder substrate. In this case, the cutouts can have the form of patterns or a tiling. The size, form, shape and position of the cutouts 25a, 25b, 25c and 25d can be varied arbitrarily depending on the desired purpose of application. In FIG. 4, a window opening 26 for receiving the chip 31 is introduced. This window opening 26 will preferably be used when chip modules are used. The antenna 32 illustrated is an antenna coil having a plurality of turns. In this case, the antenna connection 32a for the innermost coil turn crosses the coil and is electrically insulated in the region of the crossing. By means of connection contacts 32b, the coil ends are connected to the chip either directly or indirectly. In this exemplary embodiment, the cutout 25a is formed in the region of the innermost coil turn. The cutout 25a can be dimensioned depending on the desired purpose of application. It is also possible to form a plurality of cutouts, arranged in any desired form, in the inner region of the coil 10. In a further exemplary embodiment, the cutouts 25b, 25c and 25d are formed outside the region of the outmost coil turn. In this case, too, the form and the position of the cutouts 25b, 25c and 25d can be varied depending on the desired purpose of application. It is also possible to arrange the cutouts 25c in the form of patterns. Cutouts 25d are formed in the edge region of the transponder substrate 20. In this case, too, any desired forms and patterns can be realized. In further exemplary embodiments, one or a plurality of cutouts in the region of the innermost coil turn 25a can be combined arbitrarily with one or a plurality of cutouts 25b, 25c and 25d lying outside the region of the outer coil turn.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A transponder inlay for a document for personal identification, comprising:
   a transponder substrate having a thickness and having a first surface extending in first and second lateral directions,
   a transponder unit comprising a transponder chip and an antenna mounted on the transponder substrate, wherein at least the transponder chip is mounted on the first surface of the transponder substrate,
   a covering layer,
   an adhesive layer, wherein the adhesive layer is arranged between the first surface of the transponder substrate and the covering layer and secures the covering layer to the transponder substrate,
   wherein
   the transponder substrate has at least one cutout spaced laterally apart from the transponder chip and antenna along the first surface and extending through the transponder substrate, and the adhesive layer extends at least partly into the at least one cutout.

2. The transponder inlay as claimed in claim 1, wherein the adhesive layer completely fills the cutout of the transponder substrate.

3. The transponder inlay as claimed in claim 1, wherein the transponder substrate is embedded into the adhesive layer.

4. The transponder inlay as claimed in claim 1, wherein the transponder unit has a leadframe arranged on a surface of the transponder substrate and the transponder chip is arranged on the leadframe.

5. The transponder inlay as claimed in claim 1, wherein the antenna is a coil having at least one turn and at least one cutout in the transponder substrate is formed in a region of the innermost coil turn.

6. The transponder inlay as claimed in claim 1, wherein the antenna is a coil having at least one turn and at least one cutout in the transponder substrate is formed outside a region of the outermost coil turn.

7. The transponder inlay as claimed in claim 1, wherein the adhesive layer comprises epoxy resin.

8. The transponder inlay as claimed in claim 1, wherein the covering layer comprises multiple layers.

9. The transponder inlay as claimed in claim 1, wherein the covering layer has a window opening for at least partly receiving the transponder chip.

10. The transponder inlay as claimed in claim 9, wherein a top side of the covering layer is aerially flush with a top side of the transponder chip.

11. The transponder inlay as claimed in claim 1, wherein the covering layer is formed from a foamed plastic and the transponder substrate is formed from a thermoplastic.

12. A document for personal identification, having a transponder inlay as claimed in claim 1.

13. The document for personal identification as claimed in claim 12, having a cover, wherein the cover is connected to the transponder inlay by the adhesive layer.

14. The document for personal identification as claimed in claim 12, having an identity page, wherein the identity page is connected to the transponder inlay by the adhesive layer.

15. The document for personal identification as claimed in claim 12, wherein the transponder inlay is formed as an identity page.

16. A method for producing a transponder inlay, comprising:
   providing a transponder substrate having a thickness and having a first surface extending in first and second lateral directions, wherein the transponder substrate has at least one cutout extending through the transponder substrate,
   arranging a transponder unit, comprising a transponder chip and an antenna, on the transponder substrate, such that the transponder chip is mounted on the first surface of the transponder substrate and is spaced laterally apart from the at least one cutout along the first surface,
   connecting the transponder substrate to a covering layer by means of an adhesive layer between the first surface of the transponder substrate and the covering layer, wherein the adhesive layer at least partly fills the cutout in the transponder substrate.

17. The method for producing a transponder inlay as claimed in claim 16, wherein the adhesive layer is applied in such a way that the cutout of the transponder substrate is completely filled.

18. The method for producing a transponder inlay as claimed in claim 16, wherein the transponder substrate is embedded into the adhesive layer.

* * * * *